United States Patent [19]

Cole

[11] Patent Number: 4,871,045

[45] Date of Patent: * Oct. 3, 1989

[54] TELESCOPING TUBE OMNI-DIRECTIONAL SHEAR WAVE VIBRATOR

[75] Inventor: Jack Cole, Ponca City, Okla.

[73] Assignee: Conoco Inc., Ponca City, Okla.

[*] Notice: The portion of the term of this patent subsequent to Apr. 5, 2005 has been disclaimed.

[21] Appl. No.: 9,989

[22] Filed: Feb. 2, 1987

[51] Int. Cl.$^4$ .............................................. G01V 1/02
[52] U.S. Cl. ................................... 181/114; 181/119; 181/401; 367/189
[58] Field of Search ............... 181/113, 114, 116, 117, 181/119, 121, 400, 401, 108, 102–106; 367/75, 143, 189, 190, 911, 912; 73/663, 664

[56] References Cited

U.S. PATENT DOCUMENTS

| | | | |
|---|---|---|---|
| 3,034,594 | 5/1962 | Menzel et al. | 367/75 X |
| 3,280,935 | 10/1966 | Brown | 367/189 |
| 3,365,019 | 1/1968 | Bays | 181/401 X |
| 3,504,756 | 4/1970 | Bodine | 181/108 |
| 3,578,081 | 5/1971 | Bodine | 166/249 |
| 3,587,774 | 6/1971 | Bemrose et al. | 181/117 |
| 4,056,164 | 11/1977 | Johnson | 181/114 |
| 4,135,598 | 1/1979 | Stafford | 181/114 |
| 4,310,066 | 1/1982 | Won | 181/121 |
| 4,321,981 | 3/1982 | Waters | 181/114 X |
| 4,442,916 | 4/1984 | Fair | 367/75 X |
| 4,631,964 | 12/1986 | Sprunt et al. | 367/13 X |
| 4,709,362 | 11/1987 | Cole | 367/189 |
| 4,735,280 | 4/1988 | Cole | 181/113 |

FOREIGN PATENT DOCUMENTS

| | | | |
|---|---|---|---|
| 155667 | 9/1985 | European Pat. Off. | 181/114 |
| 672588 | 7/1979 | U.S.S.R. | 181/121 |
| 729541 | 4/1980 | U.S.S.R. | 367/189 |
| 2091420 | 7/1982 | United Kingdom | 367/75 |

Primary Examiner—Brian S. Steinberger

[57] ABSTRACT

Apparatus including transportation structure for generating elliptically polarized shear waves in soft earth medium. A suitable carrier includes a jack assembly for transporting shear wave apparatus that includes a telescoping tube for earth engagement. The shear wave apparatus, including a major or lower reaction mass and a passive top reaction mass, is raised and lowered by the jack assembly into operative position while the energy-coupling telescoping tube is extendably forced into an earth medium so that, during shear wave generation, the vibration source or reaction mass is continually imparting shear wave energy into the progressively extending telescoping tube to effect continual energy coupling into the surrounding earth medium. The reaction mass is driven by a plural hydraulic actuator system that imparts elliptically polarized vibration to the telescopic tube which, in turn, imparts elliptically polarized shear waves into the surrounding earth medium.

22 Claims, 8 Drawing Sheets

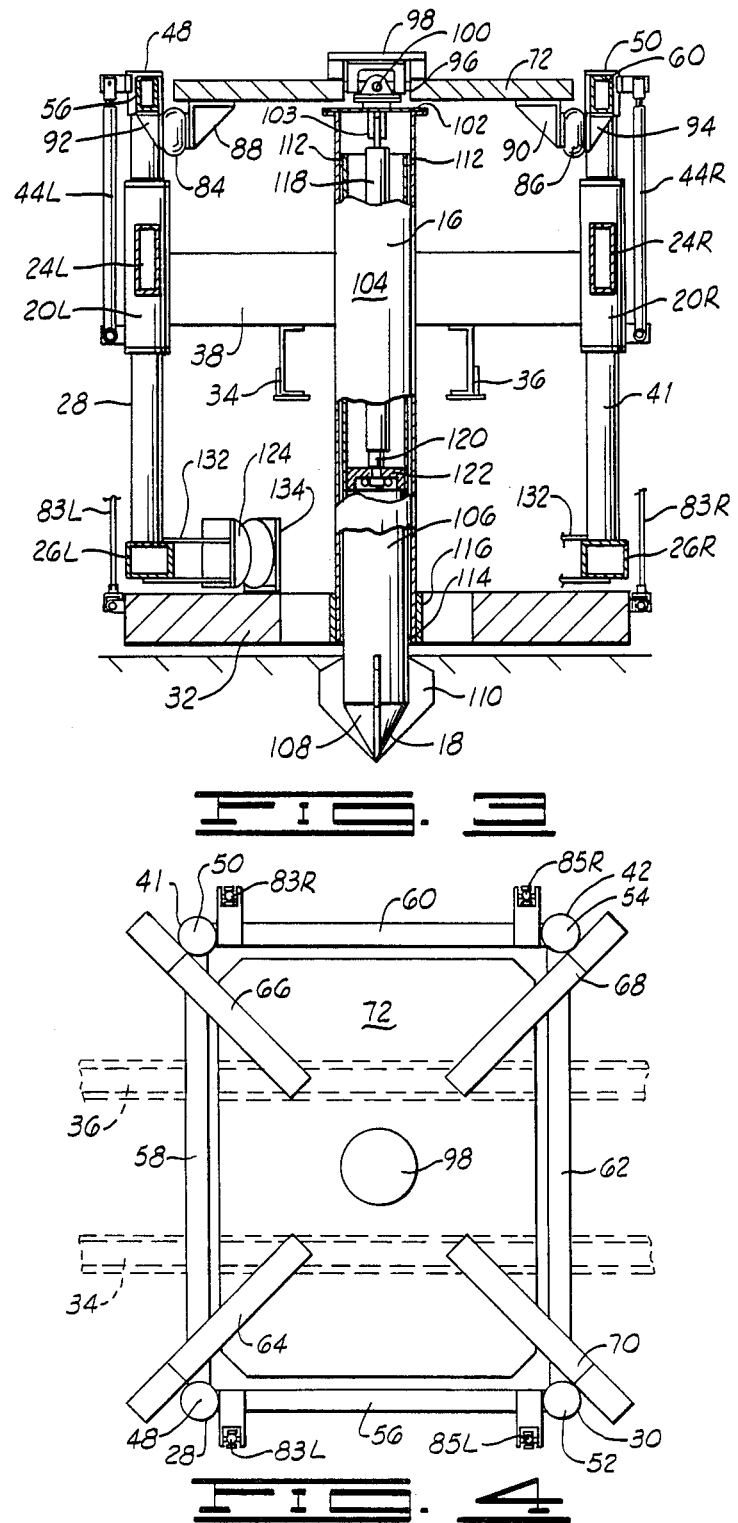

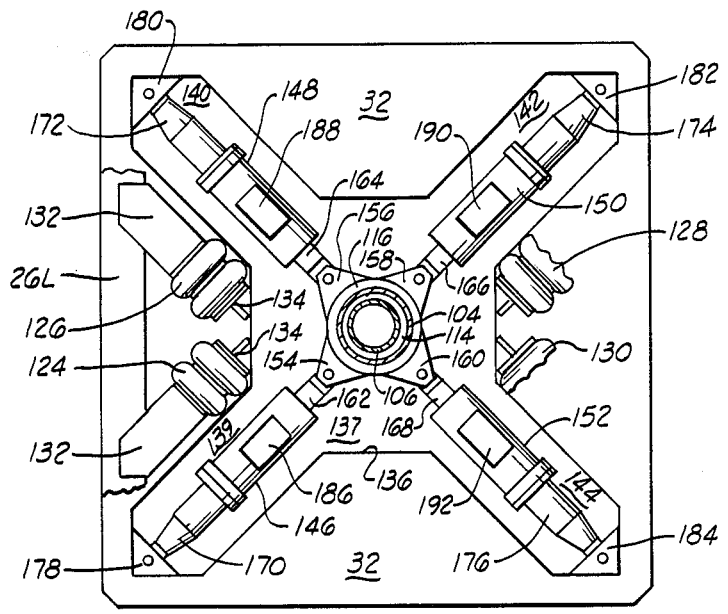
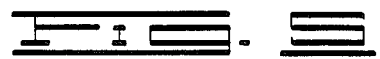
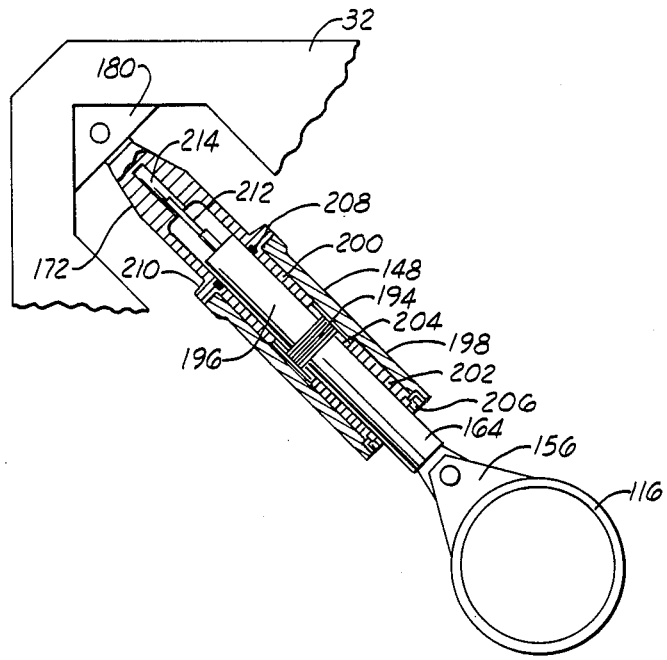
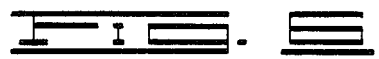

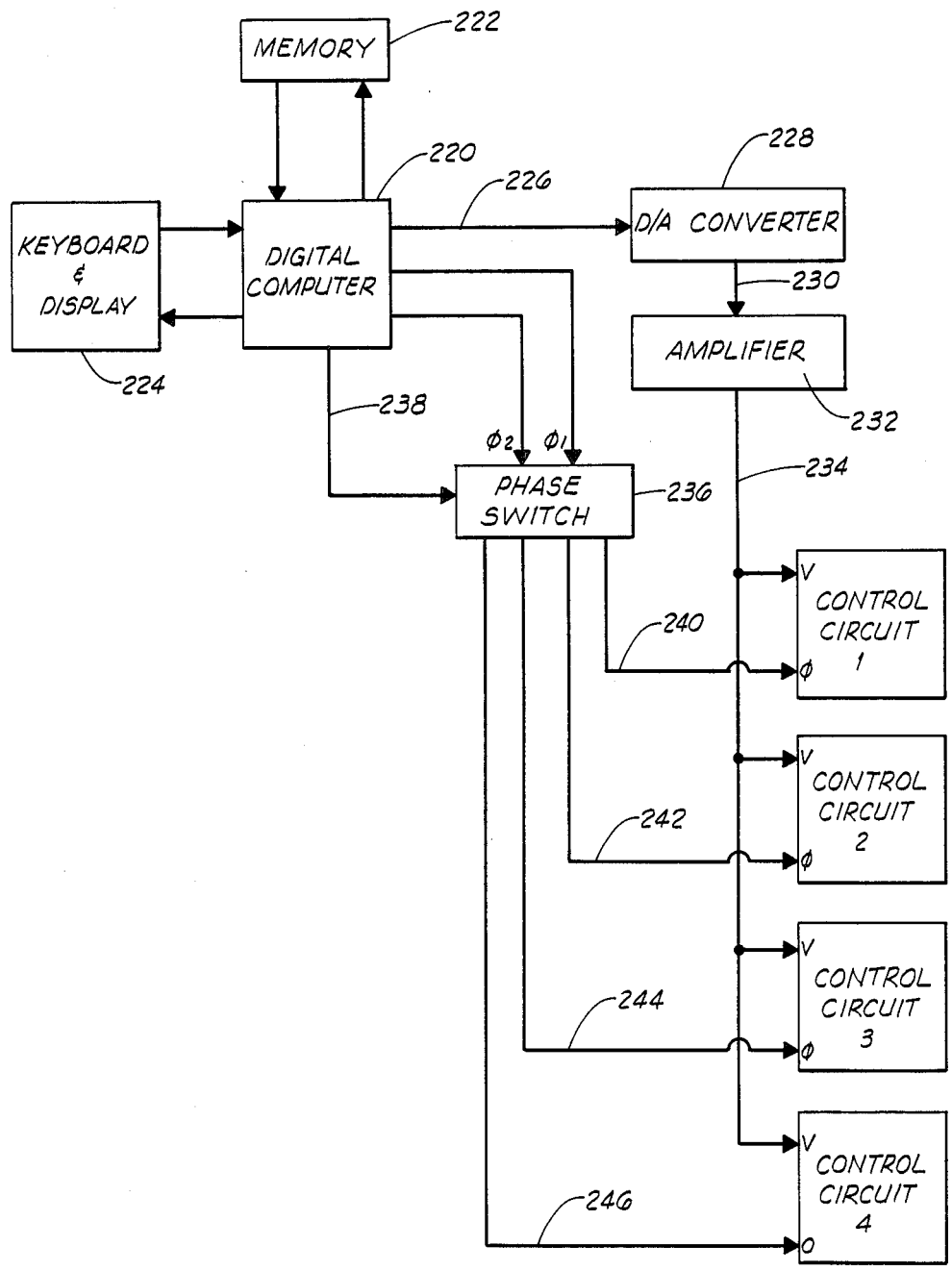
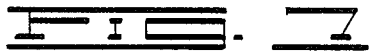

TELESCOPING TUBE OMNI-DIRECTIONAL SHEAR WAVE VIBRATOR

BACKGROUND OF THE INVENTION

1. Field of the Invention

The invention relates generally to seismic shear wave sources and, more particularly, but not by way of limitation, it relates to an improved shear wave vibrator for omni-directional coupling of shear wave energy through a telescoping tube into an earth medium.

2. Description of the Prior Art

The prior art includes a number of different types of shear wave vibrator that utilize various structures for coupling shear wave energy into an earth medium. Primarily, prior art apparatus has utilized varying forms of base plate and cleat or blade structure for maintaining positive earth engagement. Still other vibrator structures are known that utilize a cup-like structure for energy engagement in soft earth areas, e.g., U.S. Pat. No. 3,365,019 entitled "Seismic Vibrator For Marshland and Submarine Use".

The earlier types of earth-coupling mechanism have been associated with various forms of shear wave vibrator or the well-known compressional wave vibrator, and Applicant knows of no prior teachings directed to omni-directional continuous coupling of shear waves, e.g., elliptically polarized shear waves. Applicant is aware of a recently developed impulsive source that is capable of generating shear waves in any direction while simultaneously generating compressional waves, but this is primarily no more than a rotatable directional source. There is yet another recent development in the form of a shear wave vibrator having a rotatable base that enables selective generation of $S_H$ or $S_v$ shear waves.

SUMMARY OF THE INVENTION

The present invention is a shear wave vibrator for carriage on a support vehicle, i.e., truck, marine vehicle or the like, for generating elliptically polarized seismic shear waves at or near the earth's surface. The shear waves are generated by a vibrator apparatus carried on a retractable jack assembly and having a telescoping tube for engagement of vibratory energy into the earth's surface. The vibrator apparatus may be controlled variously to generate not only elliptically and circularly polarized shear waves, but also plane-polarized seismic shear waves as directed in any selected azimuth.

Therefore, it is an object of the present invention to provide an apparatus for generation of elliptically polarized seismic shear waves within soft surface earth areas.

It is also an object of the invention to provide a seismic energy vibrator that can effectively generate compressional wave signals simultaneously with elliptically polarized shear wave signals.

It is yet another object of the present invention to provide a vibrator that induces shear wave energy in an earth medium with greater efficiency in that it requires less hold-down force while maintaining equivalent energy-coupling capabaility.

It is still further an object of the present invention to provide an apparatus for generating vibratory energy in any of various types of earth surface, marshy areas or water-covered areas.

Finally, it is an object of the present invention to provide a more versatile seismic shear wave source that may be carried on a support vehicle and readily controlled as to frequency, polarity and duration of seismic energy output.

Other objects and advantages of the invention will be evident from the following detailed description when read in conjunction with the accompanying drawings which illustrate the invention.

BRIEF DESCRIPTION OF THE DRAWINGS

FIG. 3 is a vertical section with parts shown in cutaway as taken along lines 3—3 of FIG. 2;

FIG. 4 is a top plan view as viewed from lines 4—4 of FIG. 2;

FIG. 5 is a horizontal section with parts shown in cutaway taken along lines 5—5 of FIG. 2;

FIG. 6 is a view in horizontal section of a hydraulic actuator as shown in FIG. 5;

FIG. 7 is a block diagram illustrating the control circuitry utilized in the present invention;

DETAILED DESCRIPTION OF THE INVENTION

Figure 1:
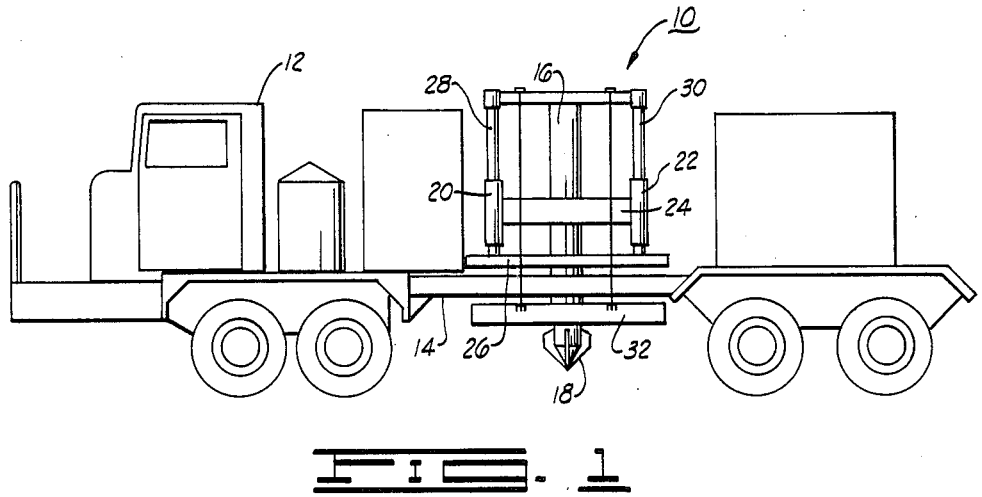
FIG. 1 is a view in side elevation of the vibrator of the present invention mounted on a support vehicle.

FIG. 1 illustrates in idealized form the manner in which omni-directional vibrator 10 might be mounted on a suitable carrier vehicle 12, in this case a specialized vehicle such as is commercially available from Crane Carrier Corp. It is preferable that the vibrator 10 be center counted on vehicle 12 so that better weight control is enabled in applying hold-down force. Thus, the vibrator 10 is primarily supported on a dual longitudinal frame 14 as the centrally located vibrator 10 couples to the earth through vertical movement of the telescoping tube 16.

The telescoping tube 16 is elongatable to force a generally conical coupling head 18 down through the earth's surface into energy-coupling relationship with the subsurface earth medium. A jack assembly consists of left and right guide cylinders 20, 22 as connected by left and right longitudinal support tubes 24. Left and right foot members 26 are connected to left and right guide posts 28, 30 which are vertically movable to place vibrator reaction mass 32 close to the earth's surface with tube head 18 inserted therein and elongated into firm earth coupling.

Figure 2:
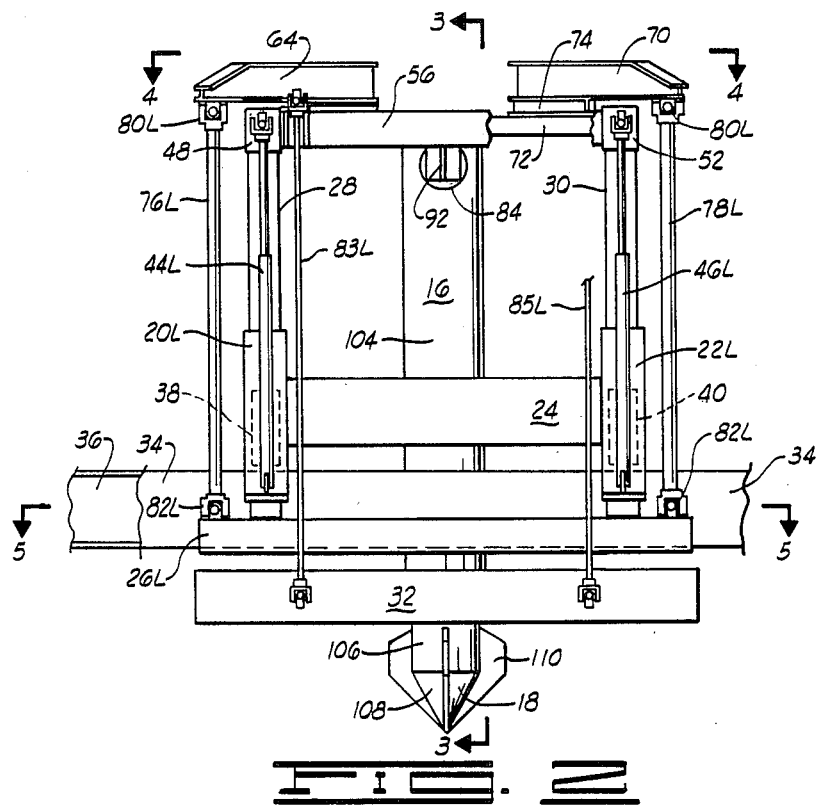
FIG. 2 is a view in side elevation, with parts shown in cutaway, of the omni-directional vibrator of the present invention.

FIGS. 2, 3 and 4 illustrate the carriage and jack assembly structure in greater detail. Thus, the longitudinal dual truck frame 14 consists of opposite side frame members 34, 36 which support fore and aft transverse tube members 38 and 40 in welded affixure. The front guide cylinders 20 L and 20 R are then secured as by welding to opposite sides of lateral tube 38, and the rear guide cylinders 22 L and 22 R are secured on opposite sides of rear lateral tube 40.

A quadrature array of guide rods 28, 30 on the lefthand side and 41, 42 on the righthand side provide a vertically positionable frame for supporting the vibrator relative to vehicle 12. Positioning of the forward guide rods relative to the guide cylinders is effected by a hydraulic actuator 44 L and 44 R, and each of the rear guide rods 30 and 42 is controlled by a respective hydraulic actuator 46 L and 46 R. The upper end of the respective guide rods receives a cap 48, 50, 52 and 54 which form corners for weld affixure to a rectangular frame consisting of structural members 56, 58, 60 and 62 (see FIG. 4). A quadrature array of post support beam brackets 64, 66, 68 and 70 are secured as by welding to the upper corner surfaces of a top or passive reaction mass 72 in such manner as to allow spaced disposition of the support brackets outward over the top frame and corner caps 48, 50, 52 and 54. As shown in FIG. 2, this may be done as by welding with spacer beams 74 provided at each corner.

The top reaction mass 72 is then supported by a quadrature array of vertical posts 76, left and right, and 78, left and right, as they are connected top and bottom by upper U-joints 80 L and 80 R and lower U-joints 82 L and 82 R to connect the respective support brackets to the foot members. Thus, support brackets 64–70 are connected universally to foot member 26 L and post support brackets 66–68 are connected to foot member 26 R. Further vertical support is connected by means of vertical support rods 83, L and R, and 85, L and R. The supports rods 83 and 85 connect between opposite forward and rearward lateral sides of the main vibrator reaction mass 32 and opposite-side frame members 56 and 60 of the top frame. Each of the vertical support rods 83 and 85 is connected top and bottom by a suitable universal joint connection to the respective top frame member and bottom reaction mass. The purpose of universal joint connections to the vertical support rods is to allow the reaction masses to translate, but not rotate in horizontal planes.

The top reaction mass 72 is further laterally positioned by opposite side air mounts 84 and 86 as secured between first air mount brackets 88, 90 welded to the underside of reaction mass 72 and air mount brackets 92, 94 as welded mid-section to respective opposite side frame tubes 56 and 60. The central area of reaction mass 72 includes an opening 96 over which a cylindrical housing 98 is formed to provide an anchor position for a U-joint 100 that is connected via a cap plate 102 to support the telescoping tube 16.

As shown particularly in FIG. 3, the telescoping tube 16 consists of an outer pivot tube 104 and an inner, concentric telescoping tube 106 which terminates in a conical head 108. Conical head 108 may be reinforced or formed of hardened steel as necessitated by usage, and such as a quadrature array of blades 110 may be employed to enhance earth engagement. The conical sidewall of head 108 subtends an angle of about 25° relative to the vertical axis of tube 106. An upper bronze bearing 112 may be secured around the top collar of telescoping tube 106 for slidable engagement with the inner surface of pivot tube 104 and, in similar manner, a lower bronze bearing 114 may be secured about the inner surface of the lower collar of pivot tube 104 to bear in sliding contact with the outer surface of telescoping tube 106. The lower portion of pivot tube 104 is inserted through a collar 116 connected to a drive yoke, as will be further described below. A hydraulic actuator 118 is secured axially within pivot tube 104 as at pivot connection 103 to extend an actuator arm 120 into affixure with a securing block 122 secured at a selected point within telescoping tube 106. thus, operation of hydarulic actuator 118 serves to extend and retract the telescoping tube 106 along its vertical axis.

The main reaction mass 32 is further maintained in lateral alignment by means of a quadrature array of air mounts 124, 126, 128 and 130 (see also FIG. 5). The air mounts 124–130 are arranged generally in opposite side lateral pairs tending to center the reaction mass 32 relative to the support apparatus, i.e., the jack assemblies consisting of the opposite-side guide cylinder and rod support structures. Thus, suitable bracket structures 132, two per side, are secured as by welding to the foot members 26, L and R, to extend horizontally inward into connection with respective air mounts 124–130. Four inner air mount brackets 134 are welded about the inner periphery of reaction mass 32 for connection to the inner side of the air mounts 124–130.

The reaction mass 32 is formed with a snowflake-type, centrally disposed opening 136 which serves to adapt the vibratory energy source for horizontal vibration within the same plane as reaction mass 32. The opening 136 is formed as a central portion 137 extending into quadrature-spaced diagonal openings 139, 140, 142 and 144 in respective corners of the reaction mass 32. The diagonal openings 139–144 provide for disposition of respective electrohydraulic actuators 146, 148, 150 and 152 therein.

The collar 116 riding around pivot tube 104 is adapted to include a quadrature array of drive flanges 154, 156, 158 and 160 which are pivotally connected to respective pivot ends 162, 164, 166 and 168 of the respective actuators 146–152. The outer pivot ends 170, 172, 174 and 176 are each further pivotally secured to respective corner flanges 178, 180, 182 and 184. The servo valves 186, 188, 190 and 192 control the coordinated drive function of the respective actuators 146–152, as will be further described below.

FIG. 6 provides an enlarged showing of the actuator 148, with parts shown in section. Thus, actuator 148 consists of a double rod end piston 194 having an outer rod end 196 and the inner rod end 164 as pivotally connected to drive flange 156. A cylinder 198 having opposite-end cylindrical bearings or packing sleeves 200 and 202 define the central cylinder chamber 204. Ports (not shown) provide fluid communication between the associated servo valve 188 and the chamber 204 on opposite sides of piston 194. An annular insert with seal 206 retains sleeve 202 in sealed, operative position at rod end 164, and a seal 208 is seated around outer rod end 196 adjacent sleeve 200. The pivot end 172 is of cylindrical formation and includes a flange 210 that is secured as by bolts to actuator housing 198 around outer seal 208. Actuator position feedback is generated by an LVDT having an axial stem 212 extending into coil bore 214. Each of the quadrature array of linear actuators 146–152 is of identical construction.

While any of a number of electrohydraulic control systems might be utilized to control operation of the vibrator 10, a preferred form of circuit is indicated in FIG. 7. Operator control may be input at a digital computer 220, e.g., a standard control microprocessor circuit functioning with a suitable memory 222 and keyboard and display 224. To control the multidirectional vibrator, it is required to correctly switch the combination of drives for the mode selected. Thus, the computer 220 produces a digital voltage sweep signal online 226 to D/A converter 228 which provides an analog output signal on lead 230 to an amplifier 232. The analog signal as amplified in output on lead 234 is an operation control voltage of designated frequency, sweep length, duration and the like. The generated voltage on lead 234 is then applied as input to each of control circuits 1–4 which function to control the individual electrohydraulic actuators 146–152 in well-known manner.

The computer 220 also outputs two digital pulse trains at selected phases $\phi_1$ and $\phi_2$ which feed through a phase switch 236. the phase switch 236 under control of computer 220 via line 238, switches selected phase signal trains via leads 240, 242, 244 and 246 for input to the phase inputs of each of the respective control circuits 1–4. Phase $\phi_1$ signal will go to one pair of control circuits while phase $\phi_2$ signal goes to the other pair of control circuits, depending upon the mode of operations selected by the phase switch control.

The computer 220 may also be utilized before the start of any sweep to initialize all drives, i.e., to synchronize drives at pre-sweep displacements and phase angles. Such a control system as that of FIG. 7 would be easily contained at one operator station in a single operator vehicle. Also, multiple vibrators may be tied together for synchronous operation in a manner similar to that presently used for synchronizing multiples of conventional vibrators.

Figure 8:
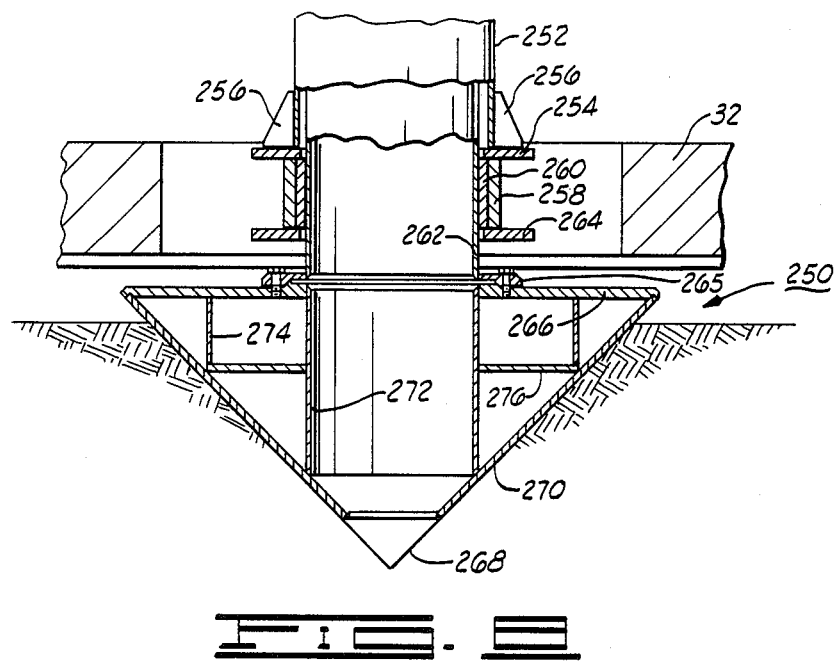
FIG. 8 is a view in vertical section of an alternative form of coupling head.

FIG. 8 illustrates an alternative form of coupling head 250 and telescoping bearing arrangement. thus, a pivot tube 252 terminates at its lower edge by affixure to a circular plate 254, e.g., welded using a plurality of gussets 256. A cylindrical plate 258 is then secured as by welding beneath circular plate 254 and spaced to retain a bronze bearing sleeve 260 in sliding position against a telescoping tube 262. A bottom circular plate 264 is then secured about the lower end of cylindrical sleeve 258 which defines on its outer surface a race upon which the actuator drive collar 116 may be positioned.

The lower end of telescoping tube 262 is secured to a circular flange plate 265 which, in turn, is secured as by a circumfery of fasteners to a base plate 266, a circular plate forming the upper part of the conical coupling head 250. The conical coupling head 250 is further formed of a hardened steel conical point 268 secured on conical side wall plate 270 which, in turn, is secured as by welding about the outer circumphery of plate 266. Side wall plate 270 subtends an angle of 45° relative to the axis of tube 262. Interior reinforcement to the cone structure is provided by an interior cylinder 272 of lesser radius and securely coupled through a cylinder 274 and disk 276 welded in reinforcing attitude between concial side walls 270 and cylinder 272. The interior cylinders 272 and 274 act as stiffening tubes within the conical structure.

Figure 9:
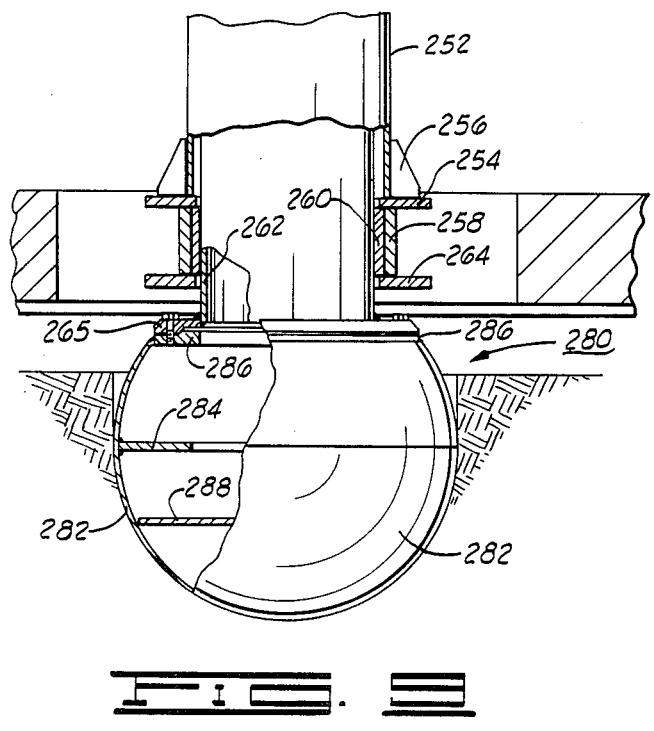
FIg. 9 is a view in vertical section, parts shown in cutaway, of another alternative form of coupling head.

FIG. 9 illustrates yet another alternative form of coupling head 280. The coupling head 280 is a welded spherical assembly that consists of a sperically formed outer skin 282. Interior stiffeners are provided to spherical skin 282 in the form of a ring plate 284 welded in bi-section of the partial sphere and generally parallel to a base plate 286 as welded to an upper sector of the partial sphere for attachment to flange plate 365 by means of a plurality of fasteners. Still other transverse stiffener plates such as circular plate 288 may be utilized as required to achieve the necessary rigidity of the spherical surface of skin 282.

Figure 10:
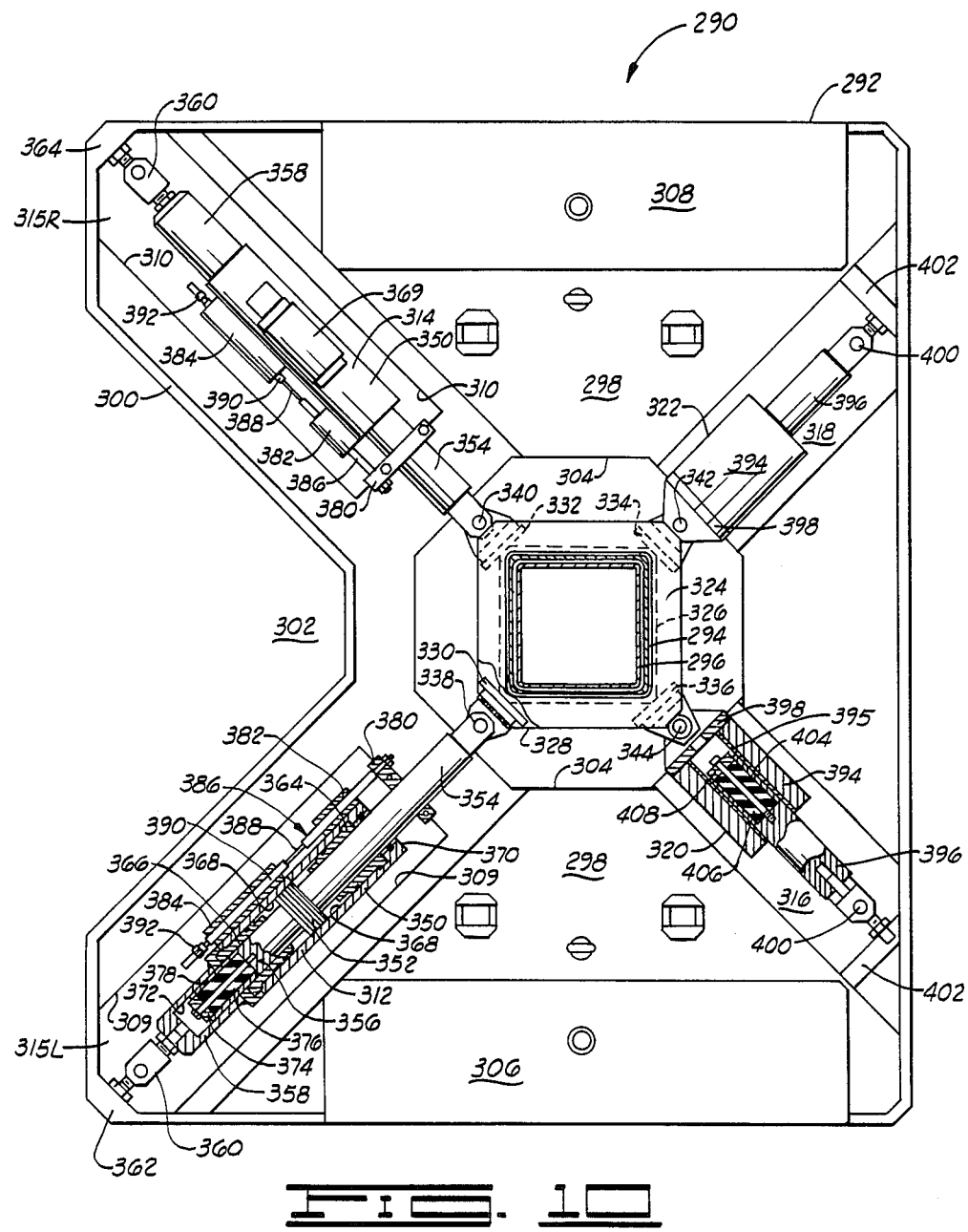
FIG. 10 is a top plan view with selected components shown in section of a two actuator seismic source.

While the foregoing vibrator embodiment functions with a reaction mass employing a quadrature array of four linear actuators driving the telescoping tube, it should be understood that multiples of two actuators are all that are required so long as their strokes are properly coordinated. FIG. 10 illustrates a two actuator elliptical shear wave generator 290 for driving a telescoping tube. In this case, it may also be noted that a particular offset configuration is utilized as evidenced by the irregular configuration of the bottom reaction mass assembly 292 and the off-center relationship to the pivot tube 294 and the telescoping tube 296. Also, while the pivot and telescoping tubes have been previously referred to as concentric cylindrical tubes, they may well be concentric square tubing as tubes 294 and 296. The present more radical design of FIG. 10 has been necessitated for mounting on a support vehicle within limited space; however, it should be understood that the dual actuator telescopic drive can also be readily constructed in a geometrically balanced design.

The bottom reaction mass assembly 292 is configured for a particular support vehicle application as formed on a generally rectangular mass bottom plate 298 having a mass side wall 300 welded therearound, and including a forward cutout or irregular portion 302 as well as an octagonal central cutout portion 304 through which the pivot tube 294 and telescoping tube 296 pass. The reaction mass bottom plate 298 further includes heavy mass members 306, 308 secured thereon and, in all, the rection mass assembly totals about 8500 pounds in the FIG. 10 design. Two forward, diagonal voids 309 and 310 of generally elongated, cubic form receive respective linear actuators 312 and 314 therein, as will be further described. Respective cover plates 315, L and R, are welded beneath voids 309, 310 to provide continuity to bottom plate 298 and to guard the respective cylinders against contact with ground irregularities. A pair of diagonal voids 316 and 318 are formed through the rearside of reaction mass plate 298, and these receive respective snubber assemblies 320 and 322, also to be further described.

The vertical centerline of octagonal central cutout portion 304 passes through the center of gravity of reaction mass assembly 292. Also, the center of gravity of reaction mass assembly 292 lies in a horizontal plane containing the horizontal centerlines of actuators 312 and 314 and snubber assemblies 320 and 322. these constraints on the center of gravity location of reaction mass assembly 292 prevent unwanted torsional disturbances during vibrator operation.

The base configuration of pivot tube 294 is similar to that of FIGS. 8 and 9 except that we are dealing with a square tube assembly. thus, the bottom edge of pivot tube 294 receives in welded affixure a square peripheral plate 324 as welded on a short section of square tube 326 as seated on a lower peripheral plate 328. The upper and lower plates 324 and 328 then provide a seating point for the quadrature arrayed connector plates 330, 332, 334 and 336 as they are welded securely therebetween. Respective rod end/clevis pivotal connections 338, 340, 342 and 344 then provide spherically pivotal connection to the respective actuators 312, 314 and snubbers 320, 322.

Referring to FIG. 10, each of the hydraulic actuators 312, 314 consists of a cylindrical actuator body 350 receiving a double rod end piston 352 therethrough. Each piston 352 includes an inner rod end 354 which is securely connected to the respective pivotal connection 338, 340. An outer rod end 356 is reciprocally disposed within an end cap 358 which is secured by means of a respective rod end/clevis pivot connector 360 to the respective corners 362 and 364 of the reaction mass assembly 292.

Piston 352 is disposed for reciprocal movement within actuator body 350 as opposite-end bronze insert sleeves 364 and 366 define a cylinder chamber 368. Ports (not shown) provide fluid communication between the electrohydraulic servo valve 369 and the opposite sides of piston 352 within cylinder chamber 368. The inner end of the actuator is terminated around inner rod end 354 by means of a seal and retainer plate 370 and the outer rod end 356 terminates in a chamber 372 of end cap 358 with a bronze bumper 374 resiliently secured on an elastomer cylinder 376 secured within end bore 378. The bumper elastomer 376 may be formed of such as Uniroyal VIBRATHANE® material or other similar substance as the bumper assembly guards against damaging over-travel of the rod end 356.

Tracking of piston travel is effected by an LVDT assembly that is supported by a clamp 380 secured around inner rod end 354, a guide rod bearing 382 secured on actuator body 312 and a mounting clamp 384 also secured on actuator body 312. A guide rod 386 is secured by guide rod bearing 382 and clamp 380 to position an LVDT stem 388 within an LVDT coil mounting structure 390 supported by mounting clamp 384. Positioning of the coil structure 390 is adjusted by manual sliding of coil structure 390 within mounting clamp 384 with mounting screws (not shown) loosened. Connector 392 provides an electrical connection of coil structure 390 to vibrator control electronics.

The rear side of reaction mass assembly 292 is characterized by reaction structure int he form of balanceing snubbers 320 and 322. Each of the snubbers consists of a cylinder 394 having a self-lubricating liner or sleeve bearing 395 for receiving a respective bumper rod 396 for reciprocal movement therein. The bumper cylinder 394 includes an end plate 398 with an axial hole for bumper clearance, plate 398 being secured to the pivotal connections 342, 344. The outer end of bumper rod 396 is secured through a rod end/clevis pivot connection 400 to a brace plate 402 as welded upright on each of mounting plates 316, 318 and other parts of reaction mass 292. The inner end of bumper rod 396 includes a counterbore 404 for receiving an elatomer bumper 406 and bronze outer bumper 408 as secured therein by an axial bolt.

Balancing snubbers 320 and 322 guard against damaging over extensions of rod ends 354. Balancing snubbers 320 and 324 are also sized such as to dynamically balance torsional forces about the vertical centerline of tubes 294 and 296. Without such balancing, unwanted dynamic torquing of tubes 294 and 296 would occur during vibrator operation.

Figure 11:
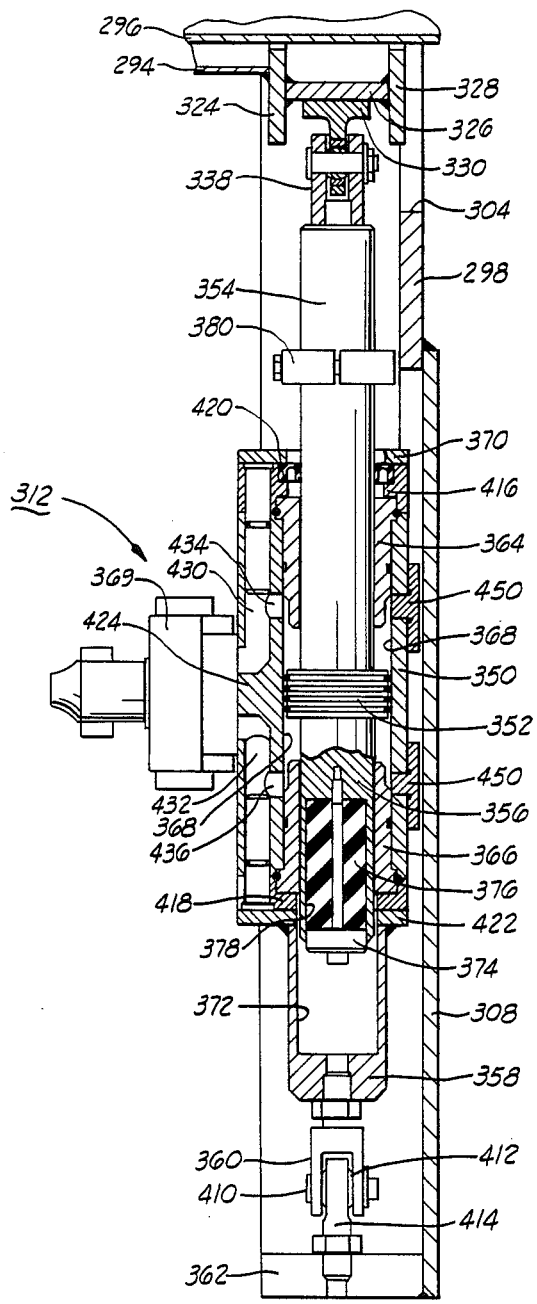
FIG. 11 is a side view in section of an actuator as shown in FIG. 10.

Referring to FIG. 11, actuator 312 is shown in greater detail, each end of the actuator is supported by a clevis/pivot connector (360, 338) of similar construction which includes a pivot pin 410 connection while also including a ball surface 412 theron for sliding spherical engagement with a yoke 414 as securely affixed to the reaction mass corner plate 362. All of the interconnections of actuator and snubber ends are of similar spherical/pivot construction to allow maximum freedom of contact during vibration.

The bronze sleeves 364, 366 are retained in place by respective sleeve retainers 416 and 418 with suitable ring sealing members included. The end cap 370 maintains a wiper seal 420 in annular engagement against sleeve retainer 416. At the opposite end, a retainer plate 422 is secured by bolting in retention of sleeve retainer 418.

An upper part 424 of cylinder 350 contains separated fluid flow passages 430 and 432. Passages 430, 432 are then in communication with fluid ports 434, 436 providing fluid communication with cylinder 368 on opposite sides of piston 352. The hydraulic servo valve 369 is secured on actuator upper part 424 in communication with the opposite side flow passages 430 and 432. Plugs 450 serve to seal opposite side ports, used for access in forming ports 434 and 436.

Figure 12:
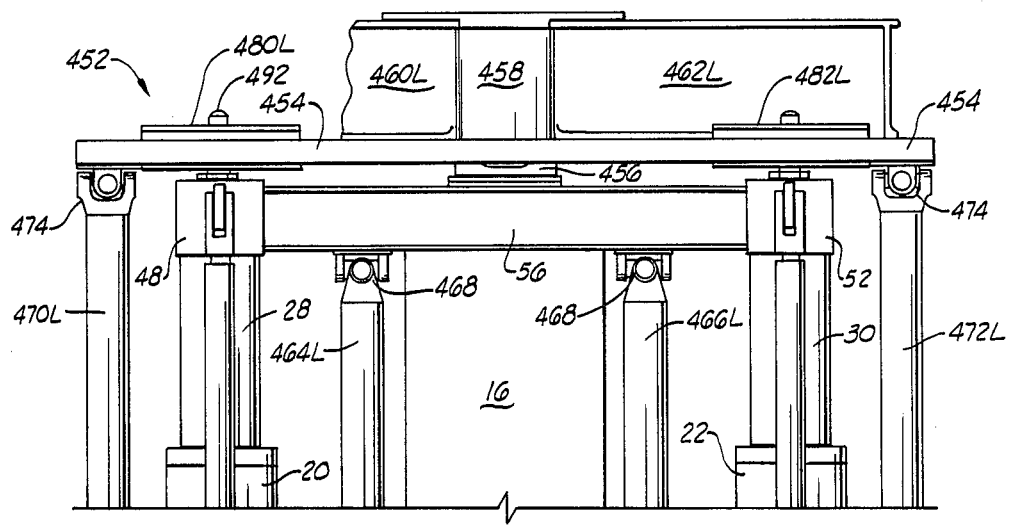
FIG. 12 is a left side view of a top portion of an alternative construction for vibrator and jack assembly.
Figures 13, 14:
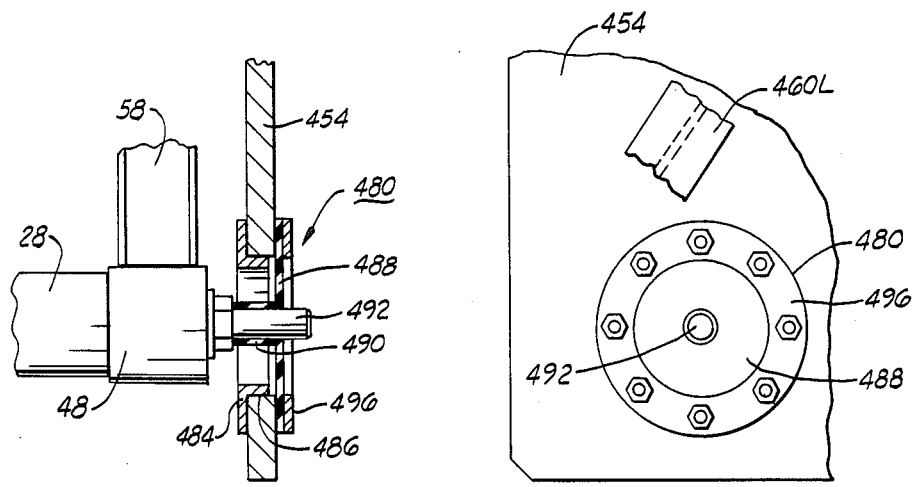
FIG. 13 is a sectional view of a corner elastomer support assembly of FIG. 12.
FIG. 14 is a top plan view of the corner of the top reaction mass of FIG. 12 showing the elastomer support assembly.

Referring to FIGS. 12, 13 and 14, an alternative form of support structure 452 is directed to a different form of connection between the passive or top reaction mass 454 and the guide rods. Some similar structure, as seen at left side view in FIG. 2, would consist of frame member 56 extending between left-side corner caps 48 and 52 on respective guide posts 28 and 30. Guide posts 28 and 30 reciprocate relative to guide cylinders 20 and 22 during raising and lowering of the vibrator apparatus. The telescoping tube 16 is secured through a suitable U-joint assembly 456 to a cylinder frame 458 secured as by welding within the quadrature arrayed stiffening beams 460 and 462, L and R. The hydraulic actuation cylinder for extension of telescoping tube 16 is contained within tube 16 and pivotally connected to U-joint 456 in connection similar to that shown in FIG. 3.

The lower reaction mass, e.g., vibrator reaction mass 32 of FIG. 2, is supported by means of suspension arms 464 and 466, left and right, as each is connected at both top and bottom ends by U-joints 468 between the upper support frame members 56, 58, 60 and 62 (see also FIG. 4) and the reaction mass suspended therebelow. Support posts 470 and 472, left and right, are also connected at top and bottom ends by respective U-joints 474 between the respective four corners of top reaction mass 454 and the support assembly foot members 26, left and right, (see FIG. 2).

Each corner of the passive or top reaction mass 454 is resiliently supported on respective corner caps 48, 50, 52 and 54 (FIG. 4) by means of elastomer disk assemblies 480 and 482, left and right. FIGS. 13 and 14 illustrate the disk assemblies in greater detail as each consists of a suitable bushing 484 secured upward through a hole 486 in the corner to top reaction mass 454. An elastomer disk 488 unitarily formed to include an axial sleeve or bumper 490 is inserted over a securing post 492 extending axially from corner cap 48–54. Elastomer disk 488 is clamped between retaining ring 496 and top reaction mass 454 by a plurality of bolts passing through holes in ring 496, disk 488, and bushing 484.

In operation, the present vibrator 10 in any of several forms is effective to maintain firm energy-coupling engagement with an earth medium throughout a vibration sequence when operating in relatively soft earth surface areas such as loose soil, snow, marshes, water-covered bottom, and similar surface situations. The telescoping tube 16 is controlled to continually depress within the engaged earth medium during the vibratory sequence so that it continually seeks firm engagement for transmission of the seismic energy. The seismic energy is generated with a phase and amplitude-controlled, multi-directional vibration technique that enable simultaneous generation of elliptically polarized shear waves and compressional waves in the receiving earth medium. Compression waves are effectively obtained by sequentially generating two mirror image, circularly polarized sweeps and then summing the recorded results. Thus, when using an azimuthally oriented array of two or more actuators in force application to the telescoping tube, proper phase control of the individual actuator contributions enables propagation of any of elliptically, linearly or circularly polarized shear waves, as is more specifically discussed in co-pending U.S. patent application Ser. No. 897,434.

The actual earth engaging surface of telescoping tube 16 includes a head structure 18 that may take any of several forms. As shown in FIG. 2, the head 18 may consist of a conical side wall 108 that is formed at about 25°-30° from the vertical axis of telescoping tube 16, and it includes a plurality of radial blades 110 disposed therearound, e.g., in quadrature array. FIG. 8 illustrates another form of coupling head 18 that consists of a cone structure having a conical side wall extending at 45° from the vertical axis telescoping tube 16.

The FIG. 9 illustration shows yet another type of coupling head 18 wherein a spherical or ball-type head 280 is formed with reinforcing structure to impart vibratory energy from telescoping tube 262 into the earth medium therearound. Thus, it can be seen that any of several coupling heads 18 might be utilized, this depending largely upon the type of soil or water bottom wherein the exploration is taking place. Still another alternative, not specifically shown, consists of a narrower conical head inclined at 24.5° from the vertical axis of the telescoping tube and terminating in a hardened steel conical point having a 30° inclined side wall. Many special forms of head and/or coupling blade structure may be developed for specific applications.

The foregoing discloses a novel, soft earth vibrator of a type capable of being transported on a support vehicle or craft, that includes a type of source that generated elliptically polarized shear waves for continual propagation into an earth medium. Control and generation structure is disclosed for generating such elliptically polarized shear waves using either two, or four, or more hydraulic actuators as controlled in phase related operation. Various support and handling structure is also disclosed for enabling utilization of the shear wave generator as deployed from vehicles or marine structures best capable of carrying and positioning such sources over soft earth areas.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Apparatus for generating and coupling shear waves into an earth medium, comprising:
   support means positionable over said earth medium;
   a single telescoping tube means stabilized by said support means and extending one end for earth engagement;
   actuation means for elongating said tube means to force said one end into the earth medium and to continually maintain firm energy coupling engagement; and
   wave generation vibration means coupled to said tube means adjacent said one end and exerting a force therethrough to impart elliptically polarized shear waves into said earth medium.

2. Apparatus as set forth in claim 1 wherein said support means comprises:
   a carrier vehicle; and
   elevating means secured to said vehicle and operable to raise and lower said telescoping tube means and wave generation means relative to said earth medium.

3. Apparatus as set forth in claim 2 wherein said elevating means comprises:
   plural guide cylinders secured on said carrier vehicle;
   plural guide posts having upper and lower ends movably disposed through said respective guide cylinders with respective lower ends resiliently secured to said wave generation means; and
   plural hydraulic actuation means connected between said guide cylinders and respective guide post upper ends, and actuatable to reciprocate said guide posts relative to said guide cylinders.

4. Apparatus as set forth in claim 3 wherein said wave generation means comprises:
   first reaction mass means resiliently secured to said guide post lower ends; and
   at least two hydraulic actuators connected in radial array between said telescoping tube means and said first reaction mass means to effect controlled reciprocal vibration.

5. Apparatus as set forth in claim 4 which further includes:
   a second reaction mass resiliently connected to the upper ends of said plural guide posts, and pivotally connected centrally to said telescoping tube means.

6. Apparatus as set forth in claim 5 wherein said telescoping tube means comprises:
   a pivot tube having an upper end pivotally secured to said support means and having a lower end;
   a telescoping tube having one end concentrically received within the pivot tube lower end and extending a pointed second end.

7. Apparatus as set forth in claim 6 wherein:
   said telescoping tube second end is a reinforced steel cone structure having plural radially oriented blades secured thereon.

8. Apparatus as set forth in claim 6 wherein:
   said telescoping tube second end is a reinforced steel spherical structure.

9. Apparatus as set forth in claim 4 wherein said hydraulic actuators comprise:
   yoke means disposed on said telescoping tube means;
   a first actuator connected between an outer extremity of said first reaction mass and said yoke means; and
   a second actuator connected between an outer extremity of said first reaction mass and said yoke means, and being displaced by a predetermined radial angle from said first actuator.

10. Apparatus as set forth in claim 9 which further includes:
    first and second reaction snubber means connected between said yoke means and said first reaction mass and being disposed in 180° displacement from the respective first and second actuators.

11. Apparatus as set forth in claim 10 wherein:

all of said actuators and reaction snubber means are disposed to lie within the plane of the reaction mass.

12. Apparatus as set forth in claim 10 which further includes:

control means for controlling said first and second actuators to operate at predetermined phase and amplitude thereby to induce elliptically polarized shear waves through said telescoping tube means into the earth medium.

13. Apparatus as set forth in claim 4 wherein said at least two hydraulic actuators comprise:

first, second, third and fourth hydraulic actuators connected in quadrature array between said telescoping tube means and said first reaction mass means to effect controlled reciprocal motion.

14. Apparatus as set forth in claim 13 which further includes:

a second reaction mass resiliently connected to the upper ends of said plural guide posts, and pivotally connected centrally to said telescoping tube means.

15. Apparatus as set forth in claim 14 wherein said telescoping tube means comprises:

a pivot tube having an upper end pivotally secured to said support means and having a lower end;

a telescoping tube having one end concentrically received within the pivot tube lower end and extending a pointed second end.

16. Apparatus as set forth in claim 15 which further includes:

yoke means slidably disposed around said telescoping tube and including a quadrature array of pivot connections for connection to respective hydraulic actuators.

17. Apparatus as set forth in claim 1 wherein said telescoping tube means comprises:

a pivot tube having an upper end pivotally secured to said support means and having a lower end;

a telescoping tube having one end concentrically received within the pivot tube lower end and extending a pointed second end.

18. Apparatus as set forth in claim 17 wherein said actuation means comprises:

a hydraulic cylinder connected between said pivot tube and said telescoping tube.

19. Apparatus as set forth in claim 18 wherein said support means comprises:

a carrier vehicle; and elevating means secured to said vehicle and operable to raise and lower said telescoping tube means and wave generation means relative to said earth medium.

20. Apparatus as set forth in claim 1 wherein said wave generation vibration means comprises:

hydraulic vibration means that imparts said elliptically polarized shear force through said tube means into the earth medium.

21. Apparatus as set forth in claim 20 wherein said hydraulic vibration means comprises:

a reaction mass centrally coupled to said tube means; and at least two hydraulic actuators imparting radial reciprocal force between said reaction mass and said tube means in ninety degree displacement relative to the tube means.

22. Apparatus as set forth in claim 20 wherein said hydraulic vibration means comprises:

a reaction mass centrally coupled to said tube means; and a quadrature array of hydraulic actuators each imparting a radial reciprocal force between said reaction mass and said tube means.

* * * * *